United States Patent
Schauss et al.

(10) Patent No.: US 9,207,429 B2
(45) Date of Patent: Dec. 8, 2015

(54) CAMERA LENS

(76) Inventors: Udo Schauss, Waldboeckelheim (DE); Ralf Linn, Niedermoschel (DE)

( * ) Notice: Subject to any disclaimer, the term of this patent is extended or adjusted under 35 U.S.C. 154(b) by 0 days.

(21) Appl. No.: 13/525,087

(22) Filed: Jun. 15, 2012

(65) Prior Publication Data
US 2012/0321293 A1 Dec. 20, 2012

(30) Foreign Application Priority Data

Jun. 16, 2011 (DE) .......................... 10 2011 051 120
Dec. 21, 2011 (EP) ..................................... 11194823

(51) Int. Cl.
G02B 9/34 (2006.01)
G02B 13/18 (2006.01)
G03B 9/06 (2006.01)
G02B 13/00 (2006.01)
G03B 11/00 (2006.01)

(52) U.S. Cl.
CPC ................ G02B 9/34 (2013.01); G02B 13/004 (2013.01); G02B 13/006 (2013.01); G03B 9/06 (2013.01); G03B 11/00 (2013.01)

(58) Field of Classification Search
CPC ...... G02B 9/34; G02B 13/004; G02B 13/006; G03B 9/02; G03B 9/06; G03B 9/08; G03B 11/00
USPC ......... 396/510, 505, 509, 449, 458, 460, 461; 359/715, 739, 740, 753, 764, 772
See application file for complete search history.

(56) References Cited

U.S. PATENT DOCUMENTS

2009/0052061 A1  2/2009  Asami
2011/0211267 A1*  9/2011  Takato ......................... 359/784

FOREIGN PATENT DOCUMENTS

| AT | 99 600 B | 4/1925 |
| AT | 343 935 B | 6/1978 |
| DE | 22 40 631 A1 | 2/1973 |
| DE | 100 15 245 A1 | 10/2010 |
| EP | 1 975 665 A2 | 10/2008 |

* cited by examiner

*Primary Examiner* — Rochelle-Ann J Blackman
(74) *Attorney, Agent, or Firm* — Hulsey Hunt & Parks, P.C.

(57) ABSTRACT

A compact camera lens composed of the following five lenses in this sequence proceeding from the object side: a first positive meniscus lens, wherein the concave surface of the first positive meniscus lens faces away from the object side; a second negative lens, wherein the object-side surface of the second negative lens is concave; a third positive lens, wherein the image-side surface of the third positive lens is convex; a fourth biconvex lens; and a fifth negative lens. The fourth biconvex lens and the fifth negative lens are in each case cemented with one another. The object-side surface of the third positive lens and the image-side surface of the fifth negative lens are of aspherical form. The objective is particularly robust, compact, has a large aperture and very good imaging characteristics. It is suitable for example as an objective of an exterior mirror replacement camera in the automotive field.

7 Claims, 8 Drawing Sheets

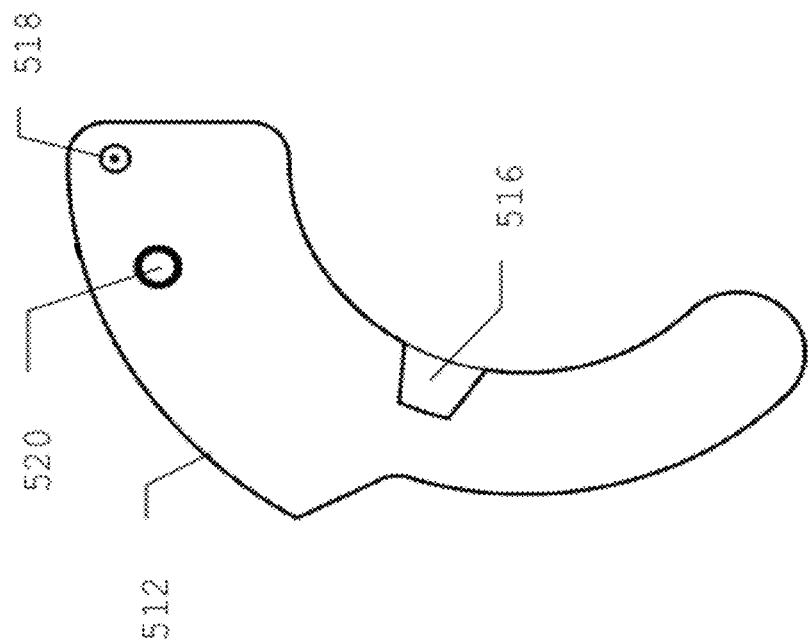
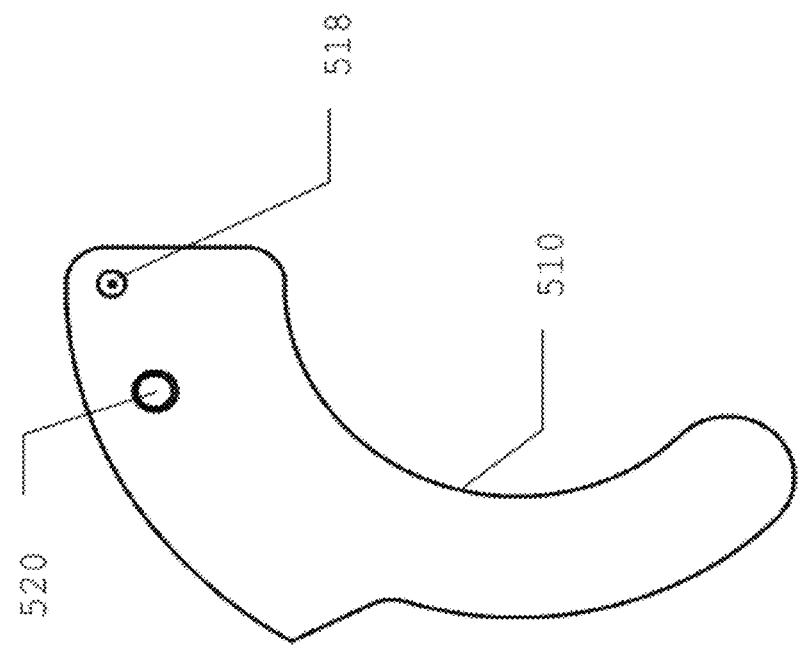

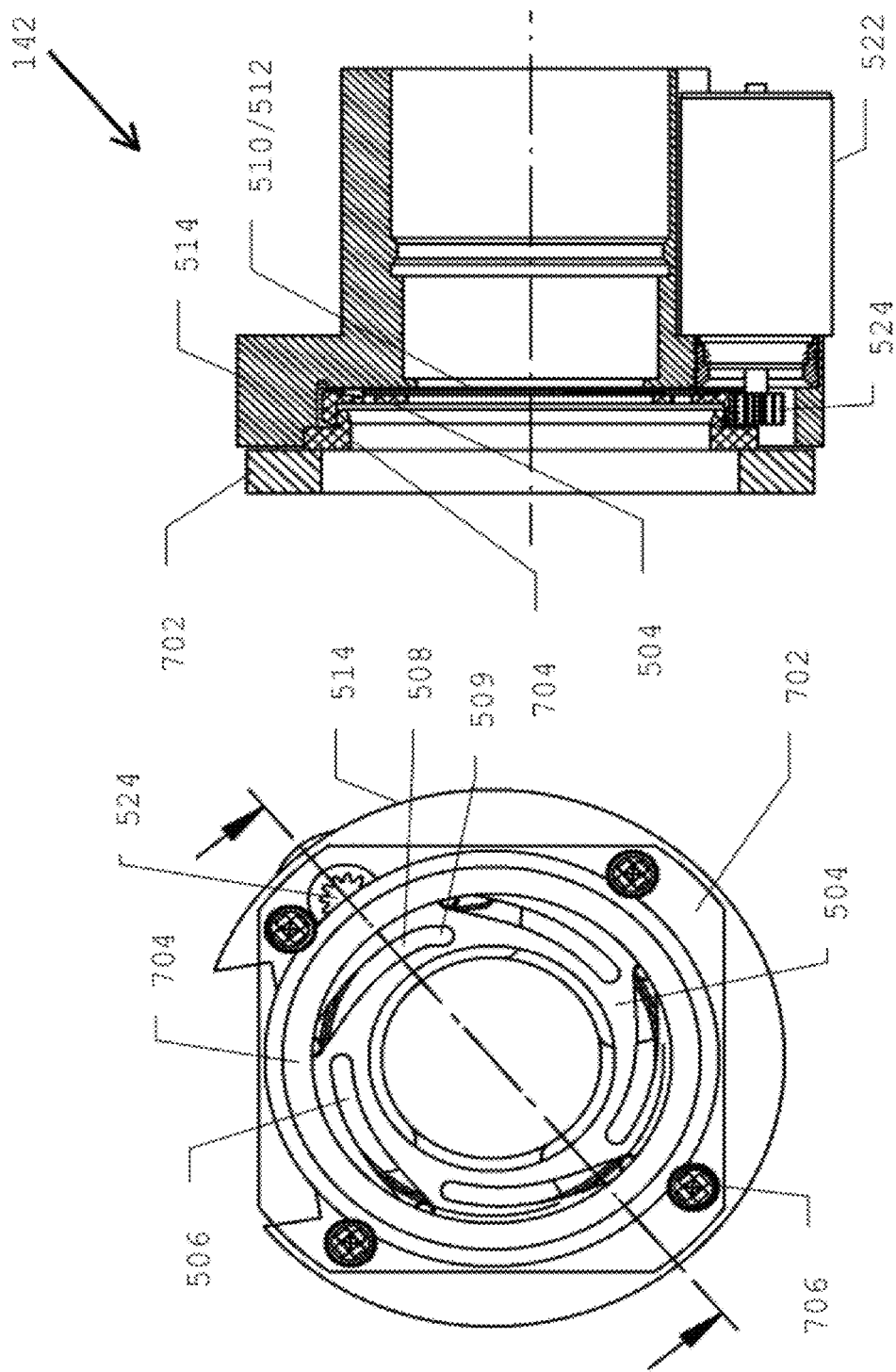

CAMERA LENS

FIELD OF THE INVENTION

For aerodynamic reasons, there is a drive to replace the exterior mirrors of automobiles with cameras which provide an overview of a corresponding area. Compact and robust cameras are required for this purpose. Said cameras must not only have small structural dimensions but must also be able to withstand the sometimes extreme demands in the automotive field, be it with regard to vibrations, temperature fluctuations, scratch resistance etc.

PRIOR ART

There have been numerous proposals for compact lenses (see for example U.S. Pat. No. 7,826,151 B2, U.S. Pat. No. 7,710,665 B2, U.S. Pat. No. 7,054,076 B2, U.S. Pat. No. 7,050,245 B2, U.S. Pat. No. 6,023,375 A or U.S. Pat. No. 5,636,067 A). However, some of these use extremely aspherical or free-form lenses in order to be able attain the respectively desired image quality despite the small structural dimensions. They therefore generally do not meet the desired conditions, inter alia with regard to production costs.

Problem

The problem addressed by the invention is that of specifying a camera lens for use in the automotive field, which camera lens ensures high image quality while being of compact design.

Solution

Said problem is solved by the invention by means of the features of the independent claim. Advantageous refinements of the invention are specified in the subclaims. The wording of all the claims is hereby incorporated in the content of this description by reference.

The invention relates to a camera lens for imaging an object, said camera lens having the following lenses in the stated sequence proceeding from the object side:
a) a first positive meniscus lens,
a1) wherein the concave surface of the first positive meniscus lens faces away from the object side;
b) a second negative lens,
b1) wherein the object-side surface of the second negative lens is concave; and
b2) wherein the value of the radius of curvature of the object-side surface of the second negative lens is smaller in magnitude than the magnitude of the value of the radius of curvature of the image-side surface of said lens;
c) a third positive lens,
c1) wherein the image-side surface of the third positive lens is convex; and
c2) wherein the value of the radius of curvature of the object-side surface of the third positive lens is greater in magnitude than the magnitude of the value of the radius of curvature of the image-side surface of said lens;
d) a fourth biconvex lens;
e) a fifth negative lens,
e1) wherein the value of the radius of curvature of the object-side surface of the fifth negative lens is smaller in magnitude than the magnitude of the value of the radius of curvature of the image-side surface of said lens; and
f) wherein the fourth biconvex lens and the fifth negative lens are cemented with one another.

The camera lens has no further lenses.

The second and third lenses are, in many embodiments of this type of lens, meniscus lenses. In other embodiments, these are however biconcave or biconvex lenses.

The fifth negative lens may be formed either as a meniscus lens with an image-side convex surface or as a biconcave lens.

That optical surface of the lens which has the most intense action is the concave object-side surface of the second lens, which has the most intense curvature and therefore, as a result of its intensely refractive effect, has the greatest influence on the overall performance of the lens.

A protective glass with an MRC ("Multi Resistant Coating") may be arranged in front of the first lens at the object side in order to protect the lens against atmospheric influences, stone impact, etc.

The proposed lens is characterized in particular in that, despite having few lenses and therefore being of very compact design, a large aperture and therefore a high illumination intensity are possible. An aperture of up to 1.2 can be realized with the proposed lens.

Even at this aperture value, the proposed lens has excellent imaging characteristics. The field curvature both sagitally and also tangentially is less than 0.2 mm at the edge of the image area for almost all wavelengths. Longitudinal chromatic aberration in the centre of the image is 0.03 mm over the entire visible spectrum.

If the aperture of the lens is reduced to 1.4, the field curvature for all colours and both sagitally and also tangentially can be reduced to less than 0.12 mm at the edge of the image area.

As a result of the very compact design and its robustness, the lens is for example very highly suitable for use as an exterior mirror replacement for motor vehicles.

It is advantageous if, in the proposed camera lens, the object-side surface of the third positive lens is formed as an aspherical surface. This effects in particular a correction of the spherical aberration of the lens.

It is likewise advantageous for the image-side surface of the fifth negative lens to also be formed as an aspherical surface. This reduces the image field curvature.

To keep image distortion as low as possible overall, it is desirable for the curvatures of the lens surfaces to be kept as flat as possible. All lenses of the lens are thus composed of highly refractive glasses. For this purpose, the arithmetic mean of the refractive indices of all of the lenses of the camera lens has a value of greater than 1.8. Here, the refractive index is determined in each case for a wavelength of 587.56 nm.

A diaphragm is preferably arranged between the second negative lens and the third positive lens. The position of the diaphragm, as selected in the proposed lens, between the second negative lens and the third positive lens is particularly expedient for a substantially homogeneous illumination of the image area.

The diaphragm is expediently an iris diaphragm with a multiplicity of blades. Here, the blades are—as is conventional—formed from a light-impermeable material.

One of the blades has a cutout in the light-impermeable material and functions as a closing blade. The cutout is covered by a neutral density filter.

The guide of the closing blade is designed such that the closing can completely close the aperture which remains when the other blades are in a stopped-down state.

The shape and position of the cutout are advantageously selected such that, when the closing blade is covering the diaphragm aperture which remains in the stopped-down state, the neutral density filter is pivoted into the diaphragm aperture which remains, that is to say covers the diaphragm aperture which remains.

As light-impermeable material for the production of the blades, use is generally made of sheet steel coated with black solid film lubricant.

In the selected diaphragm construction, the closing blade must be the uppermost or lowermost blade, because otherwise the neutral density filter mounted thereon could come into spatial conflict with the other blades.

The design of the diaphragm may be selected such that the two outermost blades of the diaphragm are formed as closing blades with a cutout which is covered by a neutral density filter.

The physical action of the blades of the iris diaphragm generates for example an f-number of between 1.2 and 13.5. The neutral density filter which is furthermore provided may be composed of a foil material which is for example adhesively bonded to the closing blade (for example by means of instant adhesive). As a result of the additional pivoting-in of the neutral density filter with an optical density of for example between 2 and 6, it is possible to attain an overall f-number of the lens of 360 and higher. The diaphragm is typically of symmetrical form, motor-driven and controlled by the camera.

Since the structural dimensions of the camera lens can satisfy the following conditions:
  height of less than or equal to 34.0 mm;
  width of less than or equal to 34.0 mm; and
  length of less than or equal to 41.0 mm,
the lens can be used in a very small space.

Further details and features will emerge from the following description of preferred exemplary embodiments in conjunction with the subclaims. Here, the respective features may be realized individually or jointly in combination with one another. The possibilities for solving the problem are not restricted to the exemplary embodiments. For example, stated ranges always encompass all—non-specified—intermediate values and all conceivable sub-intervals.

The exemplary embodiments are illustrated schematically in the figures. Here, the lens combinations of two lenses or lens combinations of said two lenses are schematically illustrated.

In detail:

FIG. 6A shows the schematic view of a diaphragm blade;

FIG. 6B shows the schematic view of a diaphragm blade with ND filter (closing blade);

FIG. 7A shows a plan view (schematic) of the diaphragm (as viewed from the object side);

FIG. 7B shows a sectional view (longitudinal section; schematic) of the diaphragm.

Figure 1:
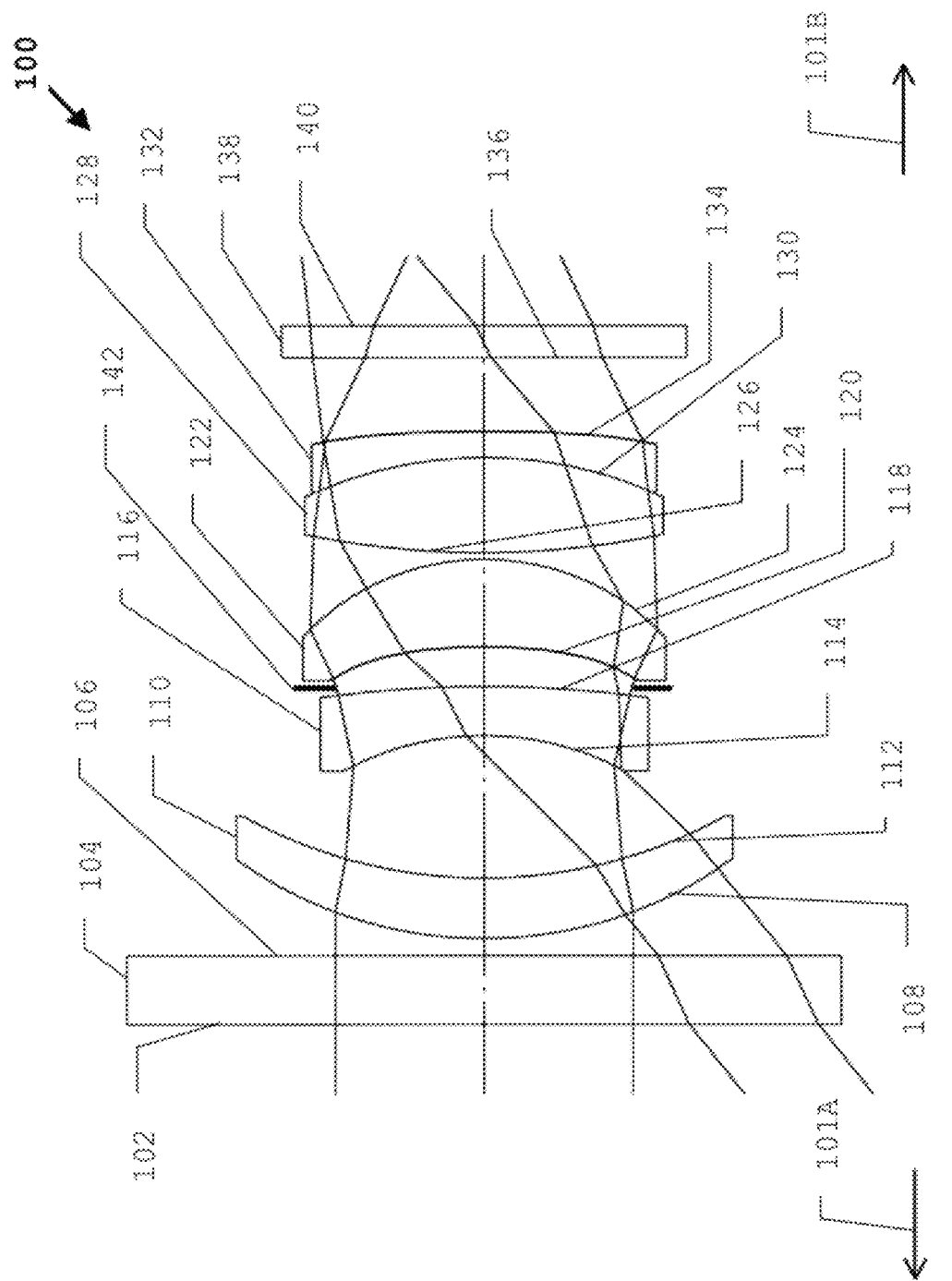
FIG. 1 is a schematic illustration of the lens arrangement of a 1.2/10 mm camera lens.
Figure 3:
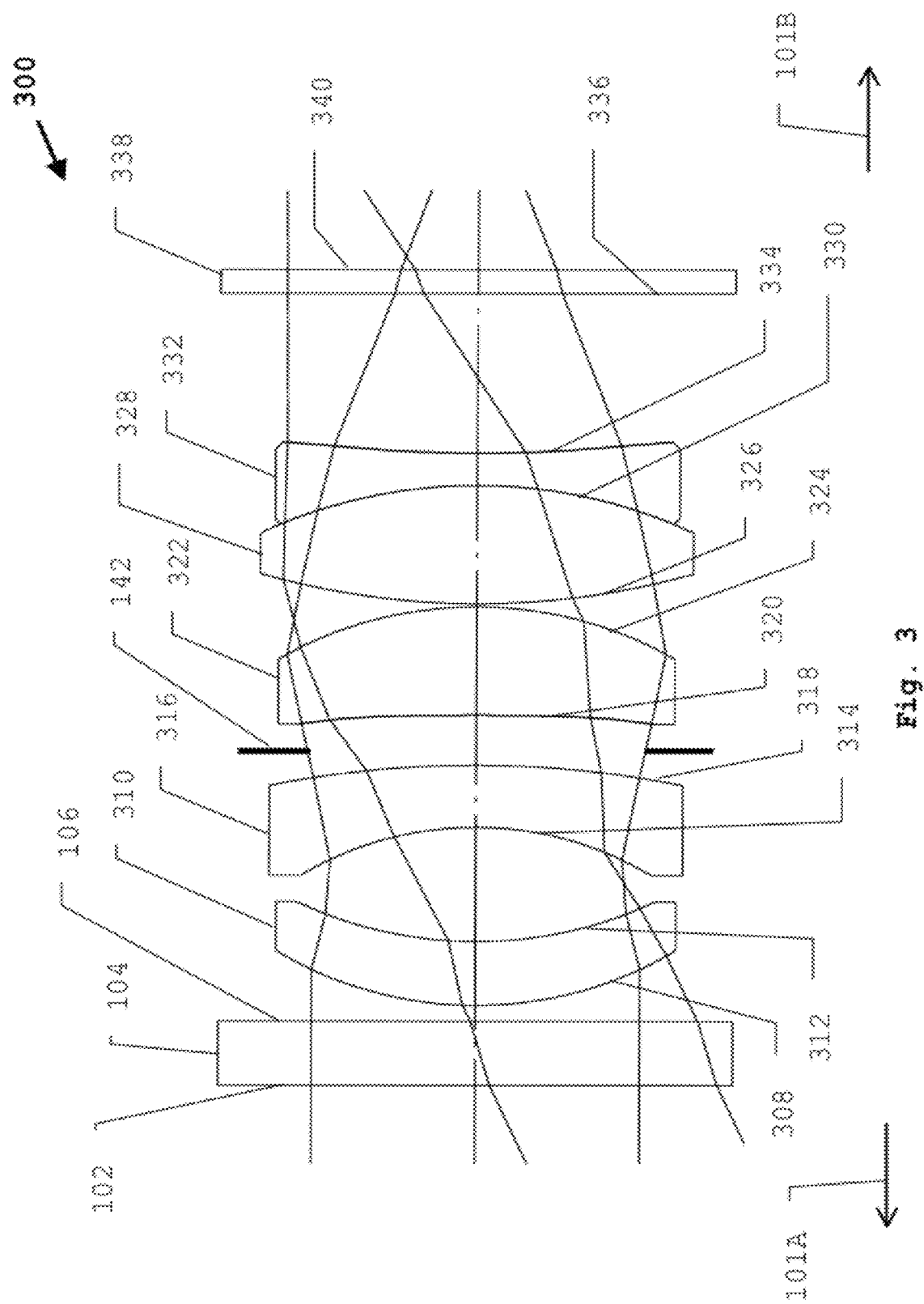
FIG. 3 is a schematic illustration of the lens arrangement of a 1.4/14 mm camera lens.

The technical data of the lens combinations of the two camera lenses as per the lens arrangements of FIGS. 1 and 3 are listed in tables 1 to 2A. In detail:

Tab. 1 is a list of the radii, the thicknesses or air spacings, the refractive indices and the Abbe numbers of the lens combination of the 10 mm camera lens as per FIG. 1;

Tab. 1A shows a list of the aspherical data of the 10 mm camera lens as per FIG. 1;

Tab. 2 is a list of the radii, the thicknesses or air spacings, the refractive indices and the Abbe numbers of the lens combination of the 14 mm camera lens as per FIG. 3; and Tab. 2A shows a list of the aspherical data of the 14 mm camera lens as per FIG. 3.

In the two exemplary embodiments as per the schematic illustrations of FIGS. 1 and 3, the proposed camera lens 100, 300 has, in the stated sequence as viewed from the object side 101A, in each case one protective glass 104 with a so-called MRC ("Multi Resistant Coating"). Arranged behind said protective glass are five lenses:

a) a first positive meniscus lens 110, 310,
  a1) wherein the concave surface 112, 312 of the first positive meniscus lens 110, 310 faces away from the object side;
b) a second negative meniscus lens 116, 316,
  b1) wherein the object-side surface 114, 314 of the second negative lens 116, 316 is concave; and
  b2) wherein the value of the radius of curvature of the object-side surface 114, 314 of the second negative lens 116, 316 is smaller in magnitude than the magnitude of the value of the radius of curvature of the image-side surface 118, 318 of said lens;
c) a third positive meniscus lens 122, 322,
  c1) wherein the image-side surface 120, 320 of the third positive lens 122, 322 is convex; and
  c2) wherein the value of the radius of curvature of the object-side surface 120, 320 of the third positive lens 122, 322 is greater in magnitude than the magnitude of the value of the radius of curvature of the image-side surface 124, 324 of said lens;
d) a fourth biconvex lens 128, 328;
e) a fifth negative lens 132, 332,
  e1) wherein the value of the radius of curvature of the object-side surface 130, 330 of the fifth negative lens 132, 332 is smaller in magnitude than the magnitude of the value of the radius of curvature of the image-side surface 134, 334 of said lens.

A CCD sensor is normally used to record the image. The fifth lens is therefore followed by a series of cover glasses 138, 338 of the CCD sensor. This can typically be simulated by a glass path of 0.75 mm.

The fourth biconvex lens 128, 138 and the fifth negative lens 132, 332 are in each case cemented with one another and form a doublet.

The fifth negative lens 132 of the camera lens 100 of the exemplary embodiment as per FIG. 1 and the fifth negative lens 332 of the camera lens 300 of the exemplary embodiment as per FIG. 3 differ in terms of the shape of the lens.

The fifth negative lens 132 of the camera lens 100 is a negative meniscus lens with an object-side concave surface 130, whereas the fifth negative lens 232 of the camera lens 300 is a biconcave lens. The image-side surfaces 134, 334 of the respective fifth negative lens 132, 332 of the two camera lenses 100, 300 are of aspherical form.

Likewise, in both camera lenses 100, 300, the object-side surfaces 120, 320 are of aspherical form.

Tables 1 and 2 list the radii, the thicknesses or air spacings, the refractive indices and the Abbe numbers of the two exemplary embodiments of the proposed camera lens as per FIGS. 1 and 3.

Figure 2:
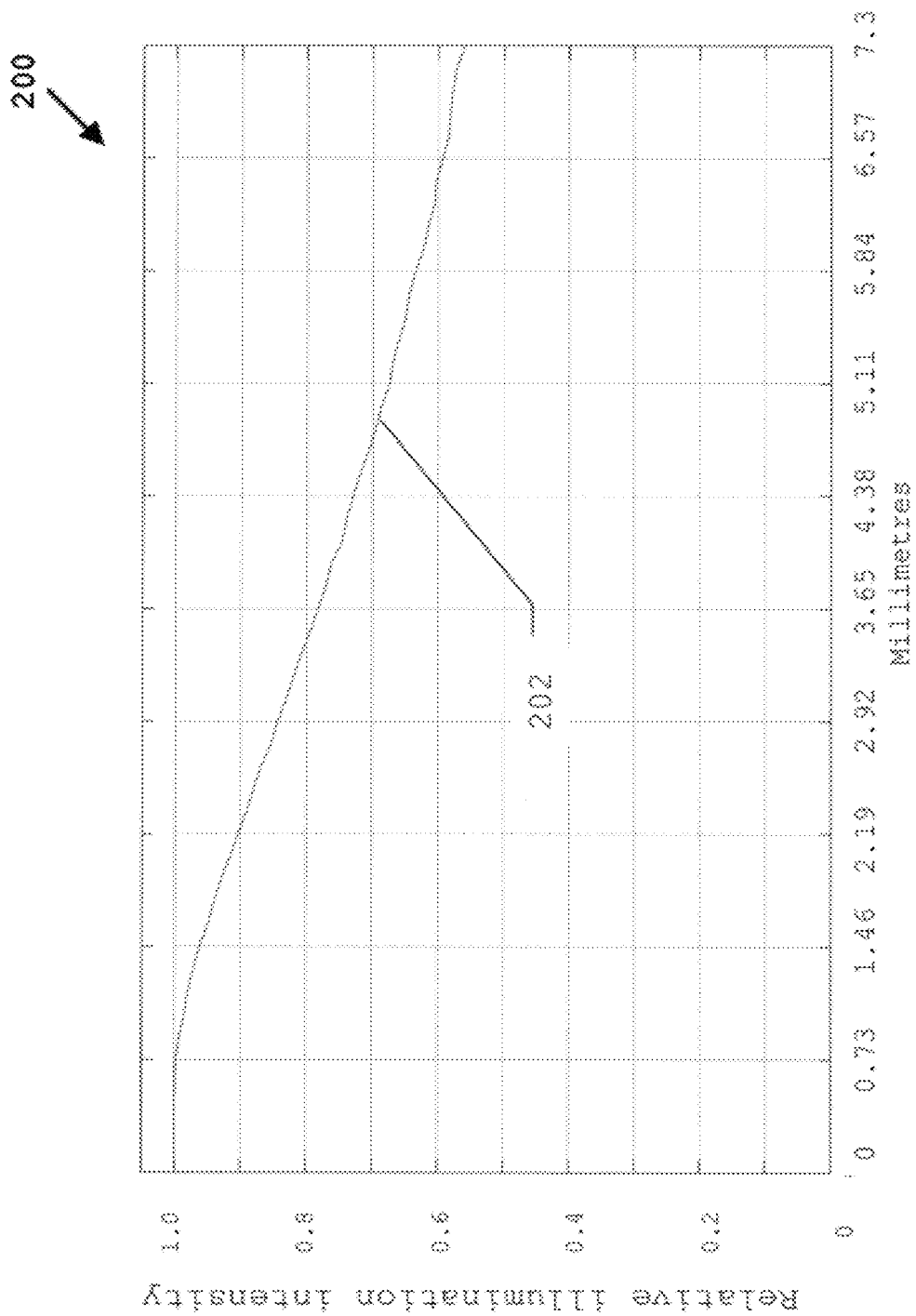
FIG. 2 shows the relative illumination intensity of the 10 mm camera lens as per FIG. 1.

In addition thereto, table 1A lists the aspherical data of the aspherical surfaces 120 and 134 as per FIG. 1, and table 2A lists the aspherical data of the aspherical surfaces 320 and 334 as per FIG. 2.

For understanding of the coefficients used in tables 1A and 2A, the following is pointed out: the surface of an aspherical lens may generally be described using the following formula:

$$z = \frac{Cy^2}{1 + \sqrt{1-(1+K)\cdot C^2 y^2}} + B_4 y^4 + B_6 y^6 + B_8 y^8 + B_{10} y^{10} + B_{12} y^{12}$$

where
- z is the sagitta (in mm) with reference to the plane perpendicular to the axis, that is to say the direction of the deviation from the plane perpendicular to the optical axis, that is to say in the direction of the optical axis;
- C specifies the so-called apex curvature. It serves to describe the curvature of a convex or concave lens surface and is calculated from the reciprocal of the radius;
- y specifies the distance from the optical axis (in mm). y is a radial coordinate;
- K specifies the so-called cone constant;
- $B_4$, $B_6$, $B_8$, $B_{10}$, $B_{12}$ represent the so-called aspherical coefficients which are the coefficients of a polynomial expansion of the function for describing the surface of the asphere.

Figure 4:
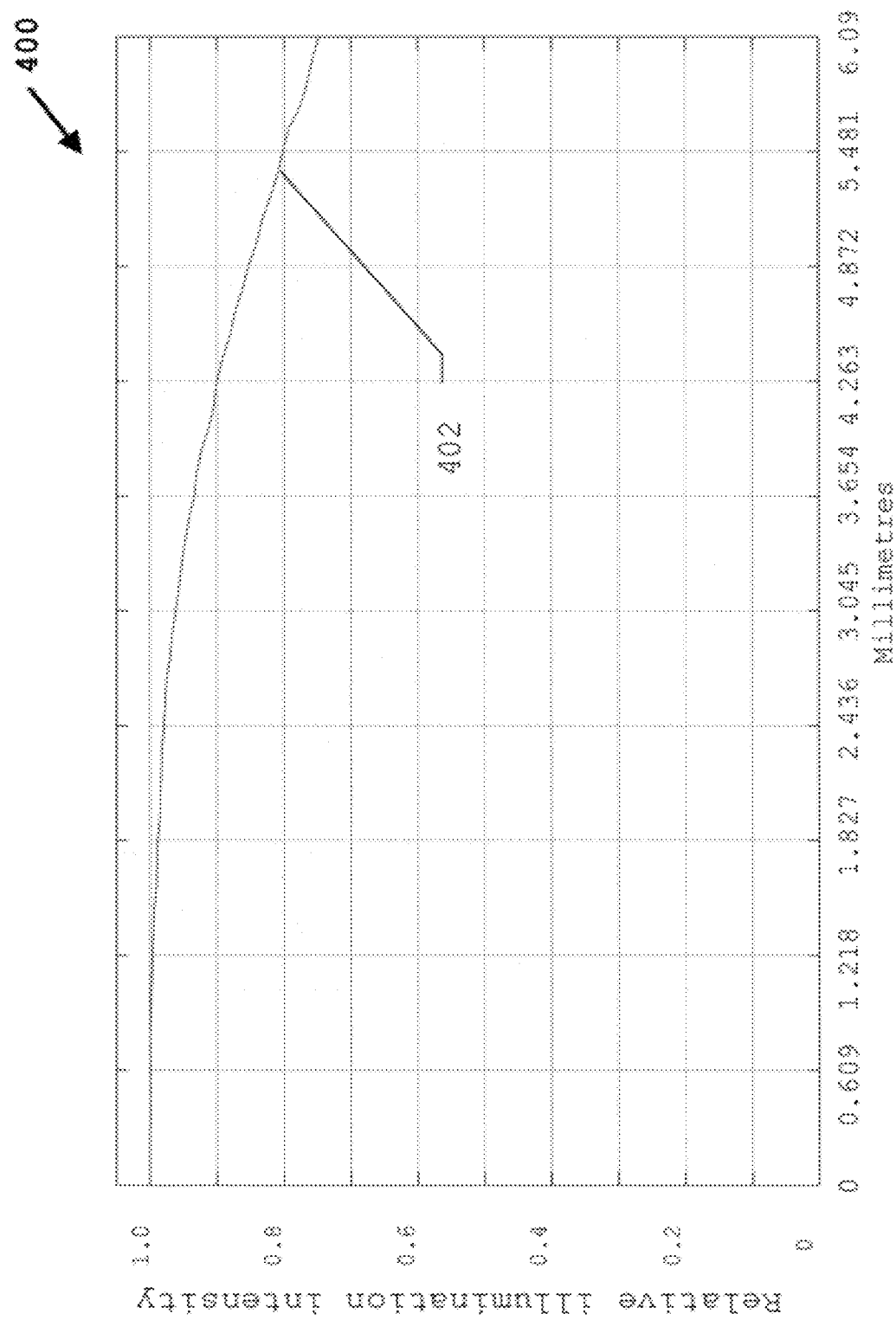
FIG. 4 shows the relative illumination intensity of the 14 mm camera lens as per FIG. 3.

FIGS. 2 and 4 graphically illustrate, as characteristic parameters of the two camera lenses 100, 300 as per FIGS. 1 and 3, for example the profile graphs 200, 400 of the relative illumination intensity.

FIG. 2 shows the profile curve 202 of the relative illumination intensity of the image with respect to the centre for the 10 mm camera lens as per FIG. 1. The x axis specifies the distance from the centre of the image at an f-number of 1.2.

FIG. 4 analogously shows the profile curve 402 of the relative illumination intensity of the image with respect to the centre for the 14 mm camera lens as per FIG. 3. The x axis specifies the distance from the centre of the image at an f-number of 1.4.

The two profile curves make it clear that the decrease in brightness from the centre to the edge of the image is low, which emphasizes the good imaging quality with regard to said characteristic parameter of the lens.

Figure 5:
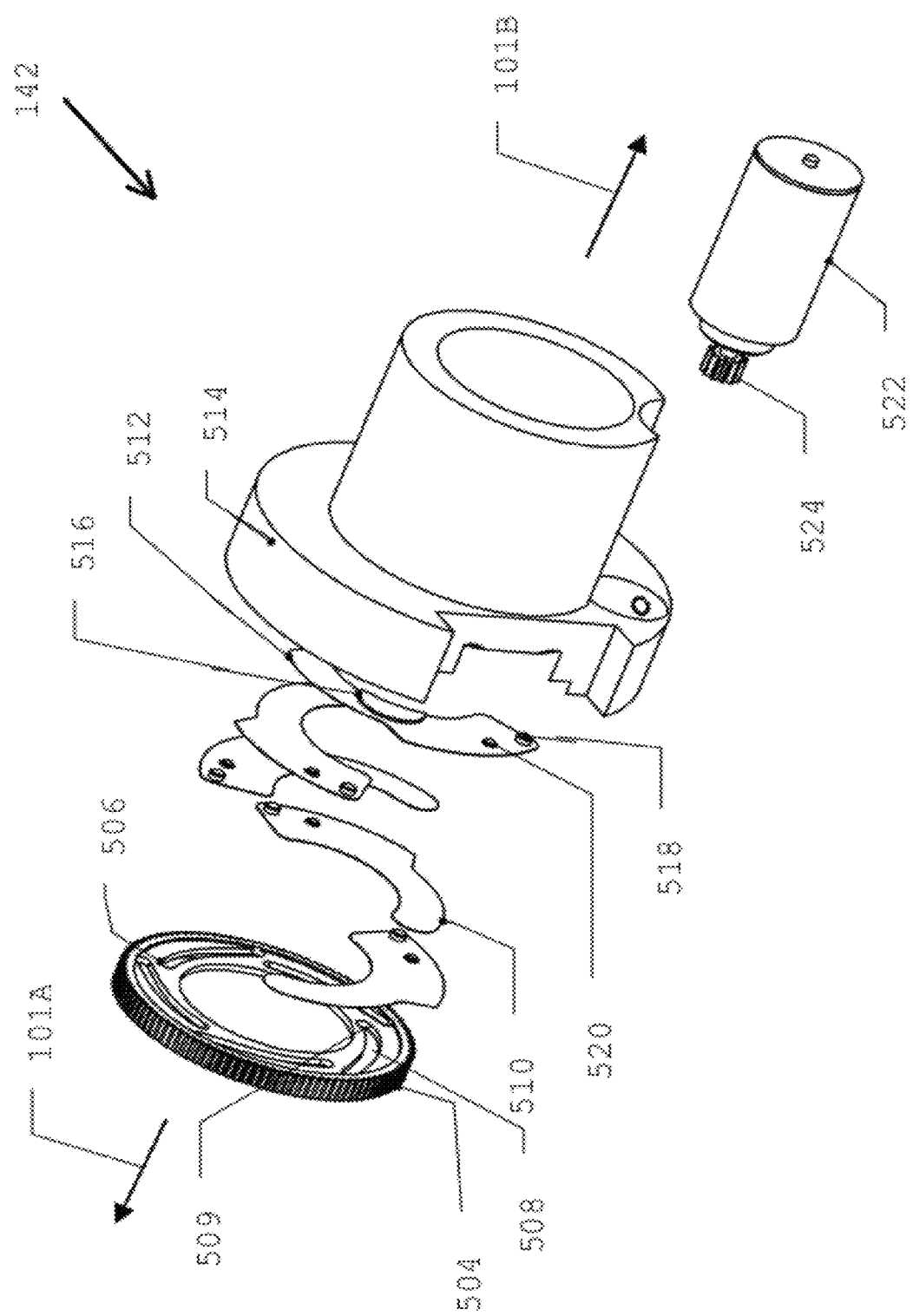
FIG. 5 is an exploded illustration (schematic) of the diaphragm with ND filter.

The exploded illustration shown in FIG. 5 shows a preferred exemplary embodiment of the diaphragm 142. As viewed from the object side 101A, the diaphragm 142 has firstly a cam disc 504 with four control cams 506 and a control cam 508. The control cams 506, 508 are specially shaped cutouts (slots) in the cam disc 504.

The cam disc 504 is furthermore followed in the direction of the image side 101B, along the optical axis of the camera lens 100, by four diaphragm blades 510 and the closing blade 512. Said closing blade lies directly on the diaphragm base, while the other diaphragm blades are arranged over said closing blade in a non-interlocking manner. The closing blade 512 has a cutout 516 which is covered by a neutral density filter (ND filter) which is composed of an ND foil which is adhesively bonded to the blade 512 over the cutout 516.

The closing blade 512 is followed by the diaphragm base 514 which simultaneously serves as a rear-side lens support.

To all of the diaphragm blades 510, 512 there are riveted in each case two diaphragm rivets: the so-called bearing rivet 518 in the direction of the diaphragm base 514, and the guide rivet 520 on the opposite side in the direction of the cam disc 504.

To realize the different diaphragm apertures by means of the diaphragm blades 510, 512, a stepper motor 522 with a drive gearwheel 524 for the cam disc 504 is arranged on the diaphragm base 514.

The control cams 506, 508 which are formed into the cam disc 504 serve as guides for the guide rivets 520 which are attached to the blades 510, 512.

The four control cams 506 are of the same shape, whereas the shape of the control cam 508 differs from that of the other control cams and serves specifically for guiding the guide rivet 520 of the closing blade 512. In order that the closing blade 512 can, by means of the ND filter, completely cover the diaphragm aperture which remains after the four blades 510 have been stopped down, the control cam 508 for the closing blade 512 has, in its final portion, a bend 509 which can pivot the closing blade over the centre of the diaphragm.

FIG. 6A illustrates one of the four diaphragm blades 510, and FIG. 6B illustrates the closing blade 512.

The bearing rivet 518 of all of the blades is in each case a fixed centre of rotation of the blades 510, 512. The guide rivets 520 arranged on the opposite side of the blades 510, 512 are arranged so as to project into the openings of the control cams (guides) 506, 508 and thus realize the guidance of the diaphragm blades 510, 512 for pivoting them in the direction of the optical axis of the camera lens 100.

The closing blade 512 illustrated in FIG. 6B additionally has, in contrast to the other blades 510, the cutout 516 which is covered by the neutral density filter.

In the views of FIG. 7A (plan view) and FIG. 7B (longitudinal section) of the diaphragm 142, the elements depicted in the exploded illustration of FIG. 5 are shown in the assembled, functional state.

Here, in addition to the elements already illustrated in FIG. 5, a flange 702 and a bearing ring 704 are also mounted on the front of the diaphragm (as viewed from the image-side direction 101A). The bearing ring 704 permits a guided rotational movement of the cam disc 504, while the flange 702, which is mounted on the diaphragm by means of the fastening screws 706 and serves as a counterpart to the diaphragm base 514, holds the diaphragm elements together.

Figure 8:
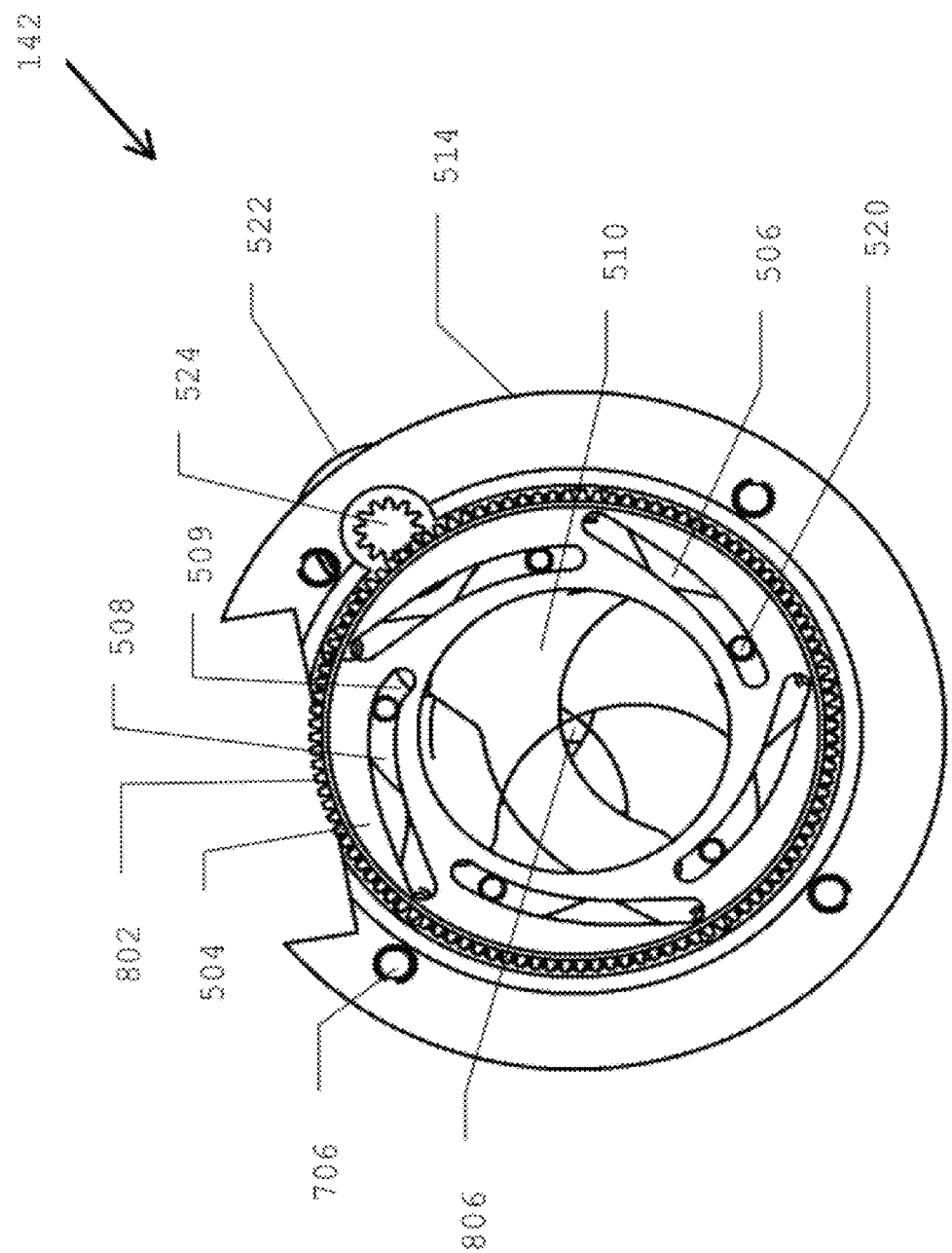
FIG. 8 shows a view of the diaphragm, without flange and bearing ring, as a plan view onto the plane of the cam disc from the object side.

FIG. 8 shows a further view of the diaphragm 124 without the flange 702 and the bearing ring 704 as a plan view onto the plane of the cam disc 504 from the object side. It is possible here to clearly see the toothed ring 802 of the cam disc 504.

The cam disc 504 is driven by the drive gearwheel 524 of the stepper motor 522, wherein the teeth of the drive gearwheel 524 engage into the teeth of the toothed ring 802 of the cam disc 504. Here, the guide rivets 520 of the blades 510, 512 are moved within the control cams 506, 508 of the cam disc 504. Said movement causes a rotation of the blades 510, 512 about their fixed rotational axles 518 (bearing rivets). Here, the position of the blades 510, 512 relative to one another changes, resulting in an increase or decrease in size of the diaphragm aperture 806.

The shape of the control cam 508 of the cam disc 504 differs from the shape of the control cams 506. The control cam 508 serves specifically for guiding the guide rivet 520 of the closing blade 512 with the ND filter. The special shape of the control cam 508 is selected such that the diaphragm aperture 806 which remains after the change in position of the blades 510 is completely covered by the closing blade 512. The cutout 516 in the closing blade, which cutout is covered by the ND filter, has the effect that, overall, a pentagonal diaphragm aperture remains, the edges of which are formed by the light-impermeable regions of all five blades 510, 512, wherein however the remaining diaphragm aperture is covered by the ND filter of the closing blade 512.

Numerous modifications and refinements of the described exemplary embodiments may be realized. For example, numerous lenses of the lens type described here may be realized which have diverse focal lengths. For focal lengths or f-numbers other than those stated above, all associated dimensions, for example radii and air spacings, may basically be scaled. This makes it possible to realize not only the two examples described but rather a whole range of lenses of the same type but with different focal lengths. The lens can thus be used for different applications.

TABLE 1

Focal length 10 mm/Aperture k = 1.2

| Reference symbol | Radius [mm] | Thicknesses or air spacings [mm] | Refractive index $n_d$ | Abbe number $v_d$ |
|---|---|---|---|---|
| 102 | INFINITE | | | |
| 104 | | 2.000 | 1.517 | 64.14 |
| 106 | INFINITE | | | |
| | | 0.500 | 1.000 | 0.00 |
| 108 | 10.426 | | | |
| 110 | | 1.760 | 1.847 | 23.77 |
| 112 | 12.229 | | | |
| | | 4.140 | 1.000 | 0.00 |
| 114 | −7.179 | | | |
| 116 | | 1.440 | 1.805 | 25.35 |
| 118 | −28.761 | | | |
| | | 1.160 | 1.000 | 0.00 |
| *120 | −14.613 | | | |
| 122 | | 2.540 | 1.835 | 42.71 |
| 124 | −6.203 | | | |
| | | 0.200 | 1.000 | 0.00 |
| 126 | 21.472 | | | |
| 128 | | 2.750 | 1.881 | 40.99 |
| 130 | −10.368 | | | |
| 132 | | 0.760 | 1.923 | 18.89 |
| *134 | −59.333 | | | |
| | | 2.170 | 1.000 | 0.00 |
| 136 | INFINITE | | | |
| 138 | | 0.900 | 1.517 | 64.14 |
| 140 | INFINITE | | | |

* = aspherical surface

TABLE 1A

| Reference symbol | | Aspherical data |
|---|---|---|
| 120 | C | −0.068432 |
| | K | 0 |
| | $B_4$ | $-0.133052 * 10^{-2}$ |
| | $B_6$ | $-0.839589 * 10^{-7}$ |
| | $B_8$ | $-0.433630 * 10^{-6}$ |
| | $B_{10}$ | 0 |
| | $B_{12}$ | 0 |
| 134 | C | −0.016854 |
| | K | 0 |
| | $B_4$ | $-0.558847 * 10^{-3}$ |
| | $B_6$ | $0.493090 * 10^{-5}$ |
| | $B_8$ | $0.123082 * 10^{-8}$ |
| | $B_{10}$ | 0 |
| | $B_{12}$ | 0 |

TABLE 2

Focal length 14 mm/Aperture k = 1.4

| Reference symbol | Radius [mm] | Thicknesses or air spacings [mm] | Refractive index $n_d$ | Abbe number $v_d$ |
|---|---|---|---|---|
| 102 | INFINITE | | | |
| 104 | | 2.000 | 1.517 | 64.14 |
| 106 | INFINITE | | | |
| | | 0.500 | 1.000 | 0.00 |
| 308 | 10.337 | | | |
| 310 | | 2.000 | 1.847 | 23.77 |
| 312 | 11.160 | | | |
| | | 3.580 | 1.000 | 0.00 |
| 314 | −9.010 | | | |
| 316 | | 1.950 | 1.808 | 22.75 |
| 318 | −27.470 | | | |
| | | 1.570 | 1.000 | 0.00 |
| *320 | −110.540 | | | |
| 322 | | 3.400 | 1.864 | 40.57 |
| 324 | −10.555 | | | |
| | | 0.100 | 1.000 | 0.00 |
| 326 | 20.822 | | | |
| 328 | | 3.710 | 1.883 | 40.75 |
| 330 | −13.490 | | | |
| 332 | | 1.010 | 1.808 | 22.75 |
| *334 | 31.832 | | | |
| | | 5.000 | 1.000 | 0.00 |
| 336 | INFINITE | | | |
| 338 | | 0.750 | 1.517 | 64.14 |
| 340 | INFINITE | | | |

* = aspherical surface

TABLE 2A

| Reference symbol | | Aspherical data |
|---|---|---|
| 320 | C | −0.009047 |
| | K | 0 |
| | $B_4$ | $-0.257407 * 10^{-3}$ |
| | $B_6$ | $-0.253065 * 10^{-6}$ |
| | $B_8$ | $0.288144 * 10^{-7}$ |
| | $B_{10}$ | $-0.340000 * 10^{-9}$ |
| | $B_{12}$ | 0 |
| 334 | C | 0.031415 |
| | K | 0 |
| | $B_4$ | $-0.143897 * 10^{-3}$ |
| | $B_6$ | $-0.691042 * 10^{-6}$ |
| | $B_8$ | $0.997740 * 10^{-8}$ |
| | $B_{10}$ | 0 |
| | $B_{12}$ | 0 |

REFERENCE SYMBOLS

100 Camera lens
101A Object side of the camera lens
101B Image side of the camera lens
102 First surface of the protective glass 104
104 Protective glass
106 Second surface of the protective glass 104
108 First surface of the lens 110
110 First lens of the camera lens
112 Second surface of the lens 110
114 First surface of the lens 116
116 Second lens of the camera lens
118 Second surface of the lens 116
120 First surface of the lens 122
122 Third lens of the camera lens
124 Second surface of the lens 122
126 First surface of the lens 128

128 Fourth lens of the camera lens
130 Second surface of the lens 128/First surface of the lens 132
132 Fifth lens of the camera lens
134 Second surface of the lens 132
136 First surface of the transparent plate 138
138 Transparent plate
140 Second surface of the transparent plate 138
142 Diaphragm
200 Graph of the profile of the relative illumination intensity
202 Profile curve of the relative illumination intensity of the 10 mm camera lens
300 Camera lens
308 First surface of the lens 310
310 First lens of the camera lens
312 Second surface of the lens 310
314 First surface of the lens 316
316 Second lens of the camera lens
318 Second surface of the lens 316
320 First surface of the lens 322
322 Third lens of the camera lens
324 Second surface of the lens 322
326 First surface of the lens 328
328 Fourth lens of the camera lens
330 Second surface of the lens 328/First surface of the lens 332
332 Fifth lens of the camera lens
334 Second surface of the lens 332
336 First surface of the transparent plate 338
338 Transparent plate
340 Second surface of the transparent plate 338
400 Graph of the profile of the relative illumination intensity
402 Profile curve of the relative illumination intensity of the 14 mm camera lens
504 Cam disc
506 Control cams for single diaphragm blades
508 Control cam for closing blade
509 Final portion of the control cam 508
510 Single diaphragm blades
512 Closing blade
514 Lens enclosure/Diaphragm base
516 Cutout with neutral density filter (ND-Filter)
518 Bearing rivet
520 Guide rivet
522 Stepper motor
524 Drive gearwheel for cam disc
702 Flange
704 Bearing ring
706 Fastening screws
802 Toothed ring of the cam disc 504
804 Bores for fastening screws
806 Diaphragm aperture

CITED LITERATURE

Cited Patent Literature

U.S. Pat. No. 7,826,151 B2
U.S. Pat. No. 7,710,665 B2
U.S. Pat. No. 7,054,076 B2
U.S. Pat. No. 7,050,245 B2
U.S. Pat. No. 6,023,375 A
U.S. Pat. No. 5,636,067 A

What is claimed is:

1. A camera lens for imaging an object, said camera lens comprising a plurality of lenses, said plurality of lenses consisting of the following elements in the stated sequence proceeding from the object side:
   a first positive meniscus lens,
      wherein the concave surface of the first positive meniscus lens faces away from the object side;
   a second negative lens,
      wherein the object-side surface of the second negative lens is concave; and
      wherein the value of the radius of curvature of the object-side surface of the second negative lens is smaller in magnitude than the magnitude of the value of the radius of curvature of the image-side surface of said lens;
   a third positive lens,
   wherein the image-side surface of the third positive lens is convex; and
      wherein the value of the radius of curvature of the object-side surface of the third positive lens is greater in magnitude than the magnitude of the value of the radius of curvature of the image-side surface of said lens;
   a fourth biconvex lens;
   a fifth negative lens,
      wherein the value of the radius of curvature of the object-side surface of the fifth negative lens is smaller in magnitude than the magnitude of the value of the radius of curvature of the image-side surface of said lens;
      wherein the fourth biconvex lens and the fifth negative lens are cemented with one another.

2. The camera lens according to claim 1, wherein the object-side surface of the third positive lens is formed as an aspherical surface.

3. The camera lens according to claim 1, wherein the image-side surface of the fifth negative lens is formed as an aspherical surface.

4. The camera lens according to claim 1, wherein the arithmetic mean of the refractive indices of all of the lenses has a value of greater than 1.8, wherein the refractive index is determined in each case for a wavelength of 587.56 nm.

5. The camera lens according to claim 1, wherein a diaphragm is positioned between the second negative lens and the third positive lens.

6. The camera lens according to claim 5, one of the preceding claims, characterized wherein:
   the diaphragm is an iris diaphragm with a multiplicity of blades;
   the blades are formed from light-impermeable material;
   at least one of the blades has a cutout in the light-impermeable material and functions as a closing blade;
   the cutout is covered by a neutral density filter;
   the guide of the closing blade is designed such that the closing blade can completely cover the aperture which remains when the other blades are in a stopped-down state; and
   the shape and position of the cutout are selected such that, when the closing blade is covering the diaphragm aperture which remains in the stopped-down state, the neutral density filter is pivoted into the diaphragm aperture which remains.

7. The camera lens according to claim 6, wherein the two outermost blades of the diaphragm are formed as closing blades with the cutout which is covered by a neutral density filter.

* * * * *